Figure 3:
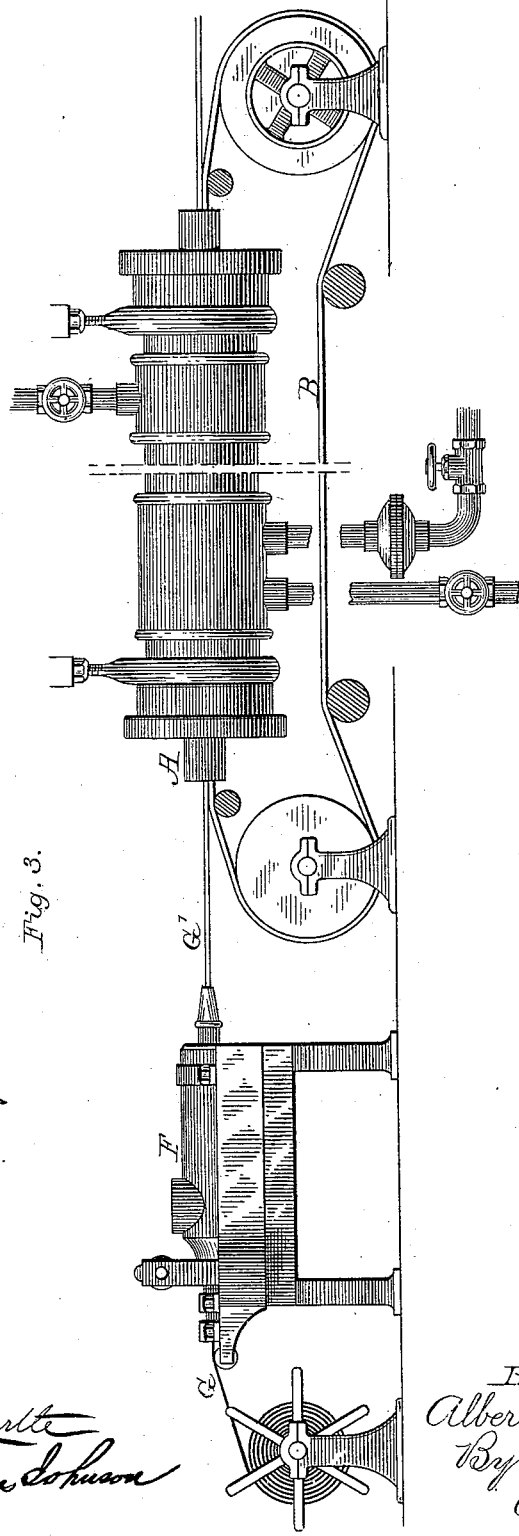

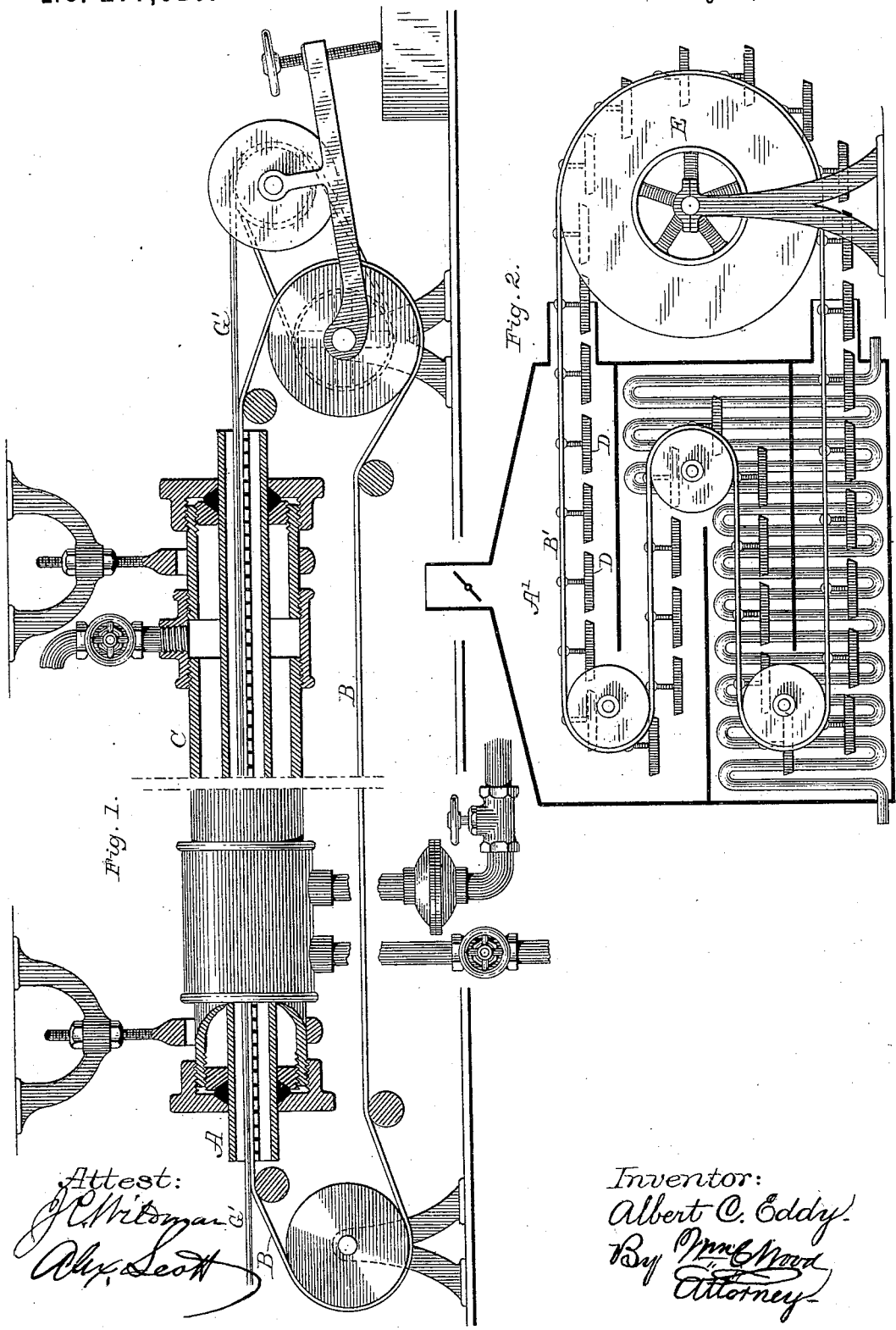

(No Model.) 2 Sheets—Sheet 2.
A. C. EDDY.
PROCESS OF WORKING AND VULCANIZING GUM COMPOUNDS.
No. 277,019. Patented May 8, 1883.

Attest:
Howell Bartle
J. W. Hamilton Johnson

Inventor:
Albert C. Eddy.
By Wm. C. Wood
Attorney

UNITED STATES PATENT OFFICE.

ALBERT C. EDDY, OF PROVIDENCE, RHODE ISLAND.

PROCESS OF WORKING AND VULCANIZING GUM COMPOUNDS.

SPECIFICATION forming part of Letters Patent No. 277,019, dated May 8, 1883.

Application filed February 7, 1883. (No model.)

*To all whom it may concern:*

Be it known that I, ALBERT C. EDDY, of the city and county of Providence, in the State of Rhode Island, have invented certain new and useful Improvements in the Art of Working and Vulcanizing Vulcanizable Compounds of Caoutchouc and Analogous Gums; and I do hereby declare that the following specification, taken in connection with the drawings furnished and forming a part of the same, is a clear, true, and complete description of my invention.

The main feature of my invention pertains to the working of vulcanizable compounds into articles or goods of great length, composed wholly or in part of said compounds, and to continuously vulcanizing the same by dry heat, in contradistinction to the direct application of steam, although humid heat can be employed without departure from my invention.

The objects sought by me vary somewhat, according to the particular line of goods to be vulcanized, although it is to be understood that certain features of my present invention are not limited to the vulcanizing of goods or articles of any particular variety, although the main object of my invention is to progressively or continuously vulcanize goods of great length, composed in whole or in part of vulcanizable gum compounds, instances of which will be mentioned with a statement of the special objects I seek to obtain in each case, and the advantages accruing by vulcanizing them in accordance with my invention.

As a type of goods composed wholly of gum compound, I will refer to flexible rubber tubing. So far as my knowledge extends, such flexible tubing has heretofore been vulcanized either while deposited in a vulcanizing-chamber and on arbors limited in length to the length of said chamber or, as in the case of small-sized tubing, in lengths usually less than the length of said chamber, it being important that they be vulcanized while in a straightened condition, although tubing of small diameter has been heretofore vulcanized in a coiled condition, with the disadvantage of having it, when finished, always inclined to assume the bent condition in which it was vulcanized. In this connection my object is to economically vulcanize, with or without arbors, flexible tubing composed wholly of vulcanizable gum compound in practically unlimited lengths without a bend or curve therein.

As types of goods composed in part of vulcanizable gum compound, I will refer to rubber-covered wires for electrical purposes. Heretofore such wires have usually been vulcanized in a coil within a vulcanizing-chamber, which results in frequent displacement of the wire in relation to the rubber, because of the weight of the overlying convolutions upon the lower. It also frequently results in the defacement of the surface of the coating by unequal compression by adhesive contact of one convolution with another, and also because of the handling and coiling of the soft or green covered wire preparatory to vulcanizing. Rubber covered wire vulcanized in coil, when straightened obviously has on one side rubber which is contracted and on the other side rubber which is stretched, because of the variation in the arcs of the circles occupied by the inner and outer surfaces of the covered wire in each convolution, thus in a measure impairing the insulating qualities of the rubber. In this connection my object is to insulate rubber-covered wire in great lengths in a straightened condition, and to obviate all liability of injury thereto by handling, and to improve the insulation, as indicated.

I am aware that rubber-covered wire has heretofore been vulcanized in a straightened condition by means of heated molds, say, ten feet in length, applied first to one end of the covered wire for, say, thirty minutes or so, and then, after moving along the wire, the molds were again applied, and so on, vulcanizing at one time to the length of the mold until the whole length of wire was completed; and in this connection my object is not only to vulcanize the wire in a straightened condition, but to perform the operation in a much more economical manner than is possible with molds. The vulcanization of rubber-covered cords, tapes, &c., is analogous to the vulcanization of insulated wire, and need not be separately considered.

Sheeted fabrics which in the piece are coated with vulcanizable gum compound, and generally known as "rubber cloths," constitute another important variety of goods which have heretofore been vulcanized either while tightly coiled or rolled with interposed fabrics subsequently removed, or they are first coiled or rolled with intervening fabric, and are then, in the vulcanizing-chamber, unrolled and smoothly hung up therein. In both cases the rubber surface of the finished product is more or less defaced by the intervening fabrics employed, and by the necessary rolling and handling; and in this connection my object is to obviate the necessity of handling, as well as the use of the intervening fabrics, and also to obviate the defacement incident thereto. When sheeted fabrics which are more or less heavily coated with gum are hung up in vulcanizing-chambers, as heretofore, it is obvious that the upper portion of each pendent length or open fold is always under a tensile strain, due to the weight of the lower portion, and that said strain lessens progressively toward the lower end of the fabric, or of a pendent length thereof, and this unequal tension on the goods by unequal stretching renders them more or less uneven in the texture of the fabrics and in the quality of surface-finish; and another object of great consequence sought by me is to vulcanize goods of great length, not only without objectionable or unequal tension on the goods for securing uniformity therein, but also to vulcanize them while in a practically horizontal position, which absolutely guards against the displacement on the fabric of the gum compound or its finishing-varnish.

In the working of vulcanizable gum compounds into articles of great length—such as tubing, insulated wires, and rubber-covered textile fabrics—I expose the goods to vulcanizing-heat progressively, so that the compounds are worked and economically vulcanized continuously without that liability of injury to the green goods and the cost of preparation which has heretofore been incident to vulcanizing processes as heretofore practiced.

Many other varieties of goods might be in like manner referred to by me; but those designated are deemed sufficient to indicate enough of the specific objects sought by me to readily suggest to persons skilled in the art other specific advantages incident to the vulcanization of many other lines of goods in accordance with my present invention.

In all cases known to me vulcanization has always heretofore been performed in chambers, which, when charged, are closed, and are not internally accessible until the operation is completed, the goods remaining therein in a quiescent state until vulcanized. If when one or more of such prior chambers are filled there is less than enough goods to fill another chamber, the cost of vulcanizing the small quantity of goods is nearly equal to that of vulcanizing the entire contents of a filled chamber, and every time a chamber is discharged and recharged there is a great loss of heat. The item of fuel in the process of vulcanization is one of great consequence, and it is important to economize therein as far as may be practicable. In these last-named connections it is my object to economize in fuel, in that in the practice of my invention I utilize the heat contained in the compounds, which is requisite for their working, and the vulcanizing-chambers are continuously being charged and discharged, and hence there is no such waste of heat as occurs with the alternate cooling and heating of chambers, as heretofore, and goods made on prompt call may therefore be at once vulcanized, because my chambers are always internally accessible.

In the working of my process of vulcanization a great variety of vulcanizing-chambers can be used in connection with apparatus employed therewith, which can also be largely varied.

Briefly stated, the gist of the main feature of my invention is the moving of vulcanizable goods through vulcanizing-chambers of sufficient length and at such speed as will enable the gum compounds to be properly subjected to heat, and thereby vulcanized during their passage through the chambers; and as applied to goods of great length—such as long tubes, insulated wires, cords, and sheeted fabrics in the piece—it further consists in passing them substantially without tension continuously or progressively through the vulcanizing-chambers, and still further in directly delivering goods of great length directly from the gum-working mechanism to the vulcanizing-chamber.

For the purpose of more fully describing my invention, I will refer to the drawings herewith, wherein I have shown vulcanizing apparatus which has been specially devised by me, and which will hereafter be made the subject of a separate application for Letters Patent.

Figure 1, Sheet 1, illustrates my apparatus for working under my process in progressively vulcanizing articles of great length, as well as ordinary goods. Fig. 2 is a vertical section of an apparatus for vulcanizing small articles only. Fig. 3, Sheet 2, is a side view of a gum-working machine arranged to deliver its product directly to a vulcanizing-chamber.

For the purposes of this specification only a general description of the gum-working machine and the vulcanizing-chambers is deemed necessary, it being understood that said machines and chambers may be largely varied in their form and construction, and in the arrangement of the mechanism employed therewith without departure from the invention herein described.

It is deemed impracticable to describe the particular working of my process of vulcanization in connection with all the various lines of rubber goods; but I will first refer to rubber-covered wire, which is one of the most important articles produced in rubber working, and it is required in the greatest lengths, and should always involve such vulcanizing operations as will enable its production in a practically perfect condition, so as to enable it to properly perform service as an insulated electrical conductor. By whatever process the vulcanizable gum compound is applied to the wire, the wire covered therewith should be maintained in as nearly a straight condition as is possible, and with minimum handling be fed longitudinally to the vulcanizing-chamber A, which contains a movable bed, B, on which the wire is supported in its passage through said chamber, the latter having a free entrance and exit for said bed and wire. This chamber is practically straight, although slightly inclined to provide for a water-grade within the steam-jacket C, which incloses the vulcanizing-chamber. The heat in said chamber throughout most of its length is maintained at about the same degree as in ordinary vulcanizing-chambers. The sectional area of the chamber is ample to receive the largest covered wire or group of such wires commonly required. The length of said chamber may be varied; but one five hundred feet in length will serve for practical purposes. The movable bed B is operated by mechanism which can be graduated as to speed. The steam feed and exit pipes and the steam-traps are all provided with cocks for enabling the graduation of heat within the chamber A. It is obvious that the slow passage of the goods through a short chamber will produce the same results as the rapid passage of the same goods through a long chamber, all other conditions being equal; and it is also obvious that the intermitting movement of the bed with goods thereon will produce similar results as when the movement is continuous, the conditions as to period of exposure and temperature being the same in both cases, so that if the covering process be intermittingly performed the bed would be intermittingly moved in the chamber; and it is obvious that such a chamber need not be so long as one through which the goods are to be carried continuously, as when the wire is covered by continuous methods, as distinguished from the intermitting methods.

It is practicable to have the vulcanizing-chambers as long as one thousand feet, and they can be so heated in sections as to enable the whole or any portion thereof to be in actual service, although in all cases the green goods would enter at one end thereof and be discharged from the other in a vulcanized or finished condition; but the vulcanizing operation would of course be performed only while the goods were in transit or passing through the properly-heated portion of the chamber.

It will be seen that under my process the rubber-covered wire is vulcanized in its straightened condition, and, resting, as it does, in one length upon the moving bed, it is free from liability of exterior defacement during the process of vulcanization, and the position of the wire within its covering is in no manner deranged, as is liable to be the case when one convolution rests upon another, as when vulcanized, as heretofore, in a coil, and that the operation of vulcanizing is much more rapid and far less expensive than by the prior hot-mold process hereinbefore referred to. Should the covered wire be drawn lengthwise through the chamber upon a stationary bed, it would still be within one feature of my invention, although such method is liable to slightly flatten one side of the covering, although in practice powdered earthy matters would be freely used upon the stationary bed for reducing to a minimum the friction of the covered wire with the bed. The passage of goods of great length without tension through the chamber is of special value in the case of sheeted fabrics covered with rubber, because they are then free from all liability of being unduly or unevenly stretched, although such goods may be successfully drawn through the chamber, and with far better results than when hung up in long open folds within the vulcanizing-chambers, as heretofore.

Under my process it is obvious that sheeted fabrics may be delivered directly to the vulcanizing-chamber from the machines by which the fabric is coated, whether by calendering or "knifing," the movement of the bed in the chamber being graduated to correspond with the feeding movements of the machine, with a sufficient slack length of the goods intervening to provide for occasional brief stoppages of the machines; or the moving bed can also be briefly stopped, if necessary. The fabric being vulcanized in a flat or horizontal position with the gum coating uppermost, it is obvious that the finish of the rubber surface can be perfectly maintained, and this is of special value in that well-known class of "carriage goods" which have a finish in an imitation of leather, which is imparted to the rubber surface by means of engraved rolls, &c.

In Fig. 2 I illustrate apparatus for vulcanizing in accordance with my invention such ordinary goods as can properly be placed in pans or trays. In this case the vulcanizing-chamber A' is traversed to and fro by an endless rack or bed, B', having bars from which trays or pans D, for receiving the green goods, are pivotally suspended and maintained in a horizontal position during their entire transit. In this case the goods are placed into and removed from the trays at the same point, in front of the main drum E, to which power is applied for intermittingly or continuously moving the bed. Even in handling small articles the continuous movement can be employed by having the goods placed on thin, light plates, readily handled with their contents.

In Fig. 3 I illustrate the direct delivery of the goods from machines by which they are made to the vulcanizing apparatus. The gum-working machine selected for illustration is one well known to be adapted to continuously deliver tubing composed wholly of gum compound, or to continuously deliver cords, tapes, or wires in great length covered with gum compound, ready for vulcanizing; and it is to be understood that, so far as my present invention is concerned, other machines may be employed for working the gum—as, for instance, a knifing-machine or a calendering-machine, both of which are adapted to coat cloth in the piece with gum compound and deliver it continuously in a condition fit for vulcanization.

As shown in the drawings, the machine F is operating in coating wire with gum compound, the latter being contained in mass within the machine, and the naked wire G being delivered from a reel in front of the machine as rapidly as the covered wire G' is delivered from said machine to the vulcanizing-chamber A, through which it is conveyed and vulcanized in transit, and from which it is delivered and coiled or wound in a finished condition, as previously described.

My process of vulcanizing gum compounds by exposing them to the action of heat while in motion is of special value, in that by their continuous or intermitting movement they are more readily freed from those gases which are developed from the compounds during vulcanizing processes, and which, especially in dry heat, are liable to and frequently do stain or discolor the goods.

It is obvious that with certain classes of goods involving the use of the gum compounds in very thin layers or in light bulk a volume of highly-heated air can be used to good advantage, if mechanically forced through the vulcanizing-chamber, or into the same at various points throughout its length, and in some cases such blasts of hot air can be relied upon without the use of steam-jackets.

In delivering the goods directly from the gum-working machines to the vulcanizing-chamber I utilize the heat necessarily remaining in the gum compounds, as these latter in all cases must be well heated to be properly worked, and the vulcanizing process is therefore more speedily and economically performed than heretofore.

When it is desirable to employ a specially humid heat, the chamber is provided with a suitable number of jet-pipes, whereby more or less steam can be admitted from the steam-jacket in Fig. 1, or from the steam-coils in the chamber, Fig. 2.

I have hereinbefore referred to the use of arbors in vulcanization of one class of tubes in the sealed vulcanizing-chambers employed in vulcanizing, as heretofore practiced; but it is obvious that green tubes while on their arbors can be vulcanized in accordance with my novel process by consecutively placing said tubes and arbors, one after the other, upon the moving bed, Fig. 1, the ends of said arbors being each provided with supporting-collars to relieve the gum from the weight of the arbor, and said collars being flattened on one side to prevent their rolling on the bed while in transit.

Having thus described my invention, I claim—

1. The improvement in the art of working and vulcanizing articles or goods of great length composed wholly or in part of vulcanizable gum compounds, which consists in delivering said articles or goods directly and continuously from gum-working mechanism to a vulcanizing-chamber, and subjecting the same to a vulcanizing-heat during their transit within and through said chamber, substantially as hereinbefore described.

2. The process of progressively and continuously vulcanizing compounds of caoutchouc and analogous gums, substantially as hereinbefore described, by moving them through a heated vulcanizing-chamber of sufficient length and at such speed as will enable said compounds to be properly vulcanized during their transit, as set forth.

3. The proces of progressively and continuously vulcanizing articles of great length composed in whole or in part of vulcanizable compounds, substantially as hereinbefore described, by moving said articles without tension thereon through a heated vulcanizing-chamber of sufficient length and at such speed as will enable the compounds to be properly vulcanized during their transit, as set forth.

ALBERT C. EDDY.

Witnesses:
PHILIP F. LARNER,
HOWELL BARTLE.